(No Model.)
S. J. STEVENS.
NUT LOCK.
No. 493,127. Patented Mar. 7, 1893.
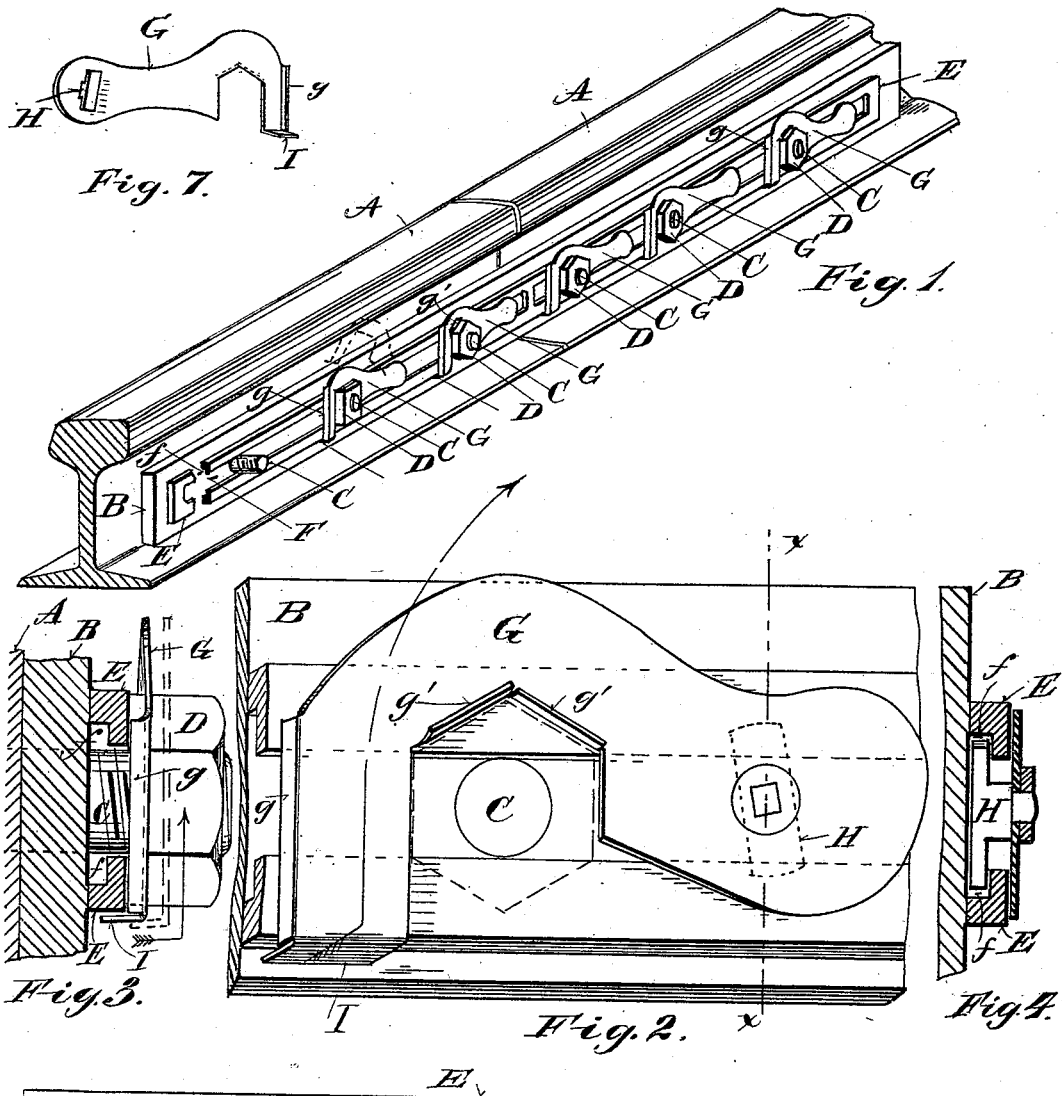
WITNESSES:
H. M. Plaisted.
Warren M. McNair.
INVENTOR
Samuel J. Stevens,
BY H. A. Toulmin,
HIS ATTORNEY.

UNITED STATES PATENT OFFICE.

SAMUEL J. STEVENS, OF SPRINGFIELD, OHIO, ASSIGNOR OF ONE-HALF TO DAVID S. TRIMMER, OF SAME PLACE.

NUT-LOCK.

SPECIFICATION forming part of Letters Patent No. 493,127, dated March 7, 1893.

Application filed December 8, 1892. Serial No. 454,445. (No model.)

*To all whom it may concern:*

Be it known that I, SAMUEL J. STEVENS, a citizen of the United States, residing at Springfield, in the county of Clark and State of Ohio, have invented certain new and useful Improvements in Nut-Locks, of which the following is a specification, reference being had therein to the accompanying drawings.

This invention relates to certain new and useful improvements in nut locks, the peculiarities of which will be hereinafter fully described in the specification and pointed out in the claims.

My improvements have reference to a supporting bar, and a locking plate or piece adapted to be adjustably mounted thereon at any part of its length, to accord with the spacement of the bolts and the nuts to be locked; have reference to a slotted supporting bar grooved lengthwise, and to a double-tongued projection from the locking plate adapted to engage therewith; and have reference to other points and peculiarities hereinafter described and claimed.

In the accompanying drawings on which like reference letters indicate corresponding parts: Figure 1, represents a perspective view of my nut-lock applied to the meeting ends of rails secured by a fish plate; Fig. 2, an enlarged perspective view of one nut-lock in position; Fig. 3, an end view of the locking plate and adjacent parts in section; Fig. 4, a cross section on the line $x$ $x$ of Fig. 2, showing the double tongue of the locking plate; Fig. 5, a detail front view of a supporting bar in the double form as shown in Fig. 1; Fig. 6, a back view of the supporting bar in its single form, showing the slot and recess, and Fig. 7, a rear perspective view of the locking plate.

The letters A A, represent the meeting ends of rails secured together by a fish plate B and bolts C, the nuts D of which are locked by my improved form of nut-lock. This consists of a supporting bar or piece E having a longitudinal slot or slots F and rabbeted or grooved at $f$ to present a lipped portion for the attachment of the locking plate. The slot is of such size as to admit the bolts C, and these slots are of such length, as to allow of any ordinary variation of the distance apart of the bolts and the number of the same. For instance, some fish-plates are provided with two bolts in each rail, and others with three; the distance apart of the bolts also vary. My supporting bar will admit of this variation in number and spacement of the bolts as it can be slipped over the ends of the same, and the nuts screwed up to bearing contact. The locking plate or hook is now applied after the nuts are screwed to place. This locking-plate G consists of a plate of sheet metal or other spring material, and is secured to the supporting bar by means of a double tongued projection H, near one end of the plate, which is slipped sidewise into the slot F and the plate turned till the ends of the projection engage with the grooves $f$, as shown in Figs. 2 and 4. The plate is notched to engage with a square or hexagonal nut, and provided with a hook portion I forming a lip that snaps over the lower edge, or other part of the supporting bar, when the plate is rotated into locking position, as shown in Fig. 2. The plate is stiffened by ribs $g$ $g'$, the rib $g$, near the hook portion I, serving to hold the plate away from the supporting bar and form a space to admit of inserting a wedge behind the plate to spring the hook I out of engagement with the bar, as shown in Fig. 3.

The arrows in Figs. 2 and 3 indicate the manner of removing the locking plate by springing it outward, and then rotating it about the double-tongued portion H as a center. The double-tongued projection may be formed by a separate piece riveted to the locking-plate by an angular stud to prevent its turning as shown in Figs. 2 and 4; or the projection may be otherwise formed so long as it admits of insertion into the rotating position to engage the tongue with the recesses or under-cut portions of the bar.

It will be seen that the locking plate may be mounted on the supporting bar at any part of its length; that my nut lock is not confined to a particular spacement of the bolts nor the number thereof. Also the locking plate is not attached to the supporting bar till the nuts are screwed down to their place; then the locking-plate is attached for each nut by simply inserting the tongued projection sidewise into the groove and rotating the plate till it engages with the nut, and the hook portion snaps over the locking bar to maintain it in locked position.

The supporting bar may have a single slot therein, as shown in Fig. 6; or it may be provided with more than one slot and be applied to the entire length of the joint as shown in Fig. 1. Its length may be such as to accommodate a joint of four or six bolts, as may be required; or any suitable length may be used. The hook I, may be on either side of the nut and engage with any part of the supporting bar.

Having thus fully described my invention, what I claim as new, and desire to secure by Letters Patent, is—

1. In a nut lock, the combination with a supporting bar having longitudinal recesses or grooves forming overhanging lips, of a locking plate having a double-tongued projection adapted to enter said grooves or recesses and engage therewith by rotating the plate, and having also a hook portion to engage with the bar and maintain the plate in locking position.

2. In a nut lock, the combination with a supporting bar having longitudinal slots to admit the fastening bolts, and recessed along the edges of the slots, of a spring locking plate having a double-tongued projection at one end adapted to enter the slots and engage with the recesses by turning into locking engagement with the adjacent nut, and a hook portion forming a lip adapted to snap over the said bar after such rotation and maintain the plate in locking position.

3. In a nut lock, the herein described locking plate, the same consisting of a resilient piece adapted to engage with a nut, and having a double tongued projection on one end, and a hook portion forming a lip, the resiliency of the plate admitting of the lateral engagement of the lip portion, substantially as shown and described.

In testimony whereof I affix my signature in presence of two witnesses.

SAMUEL J. STEVENS.

Witnesses:
OLIVER H. MILLER,
WARREN M. MCNAIR.